Figure 1:
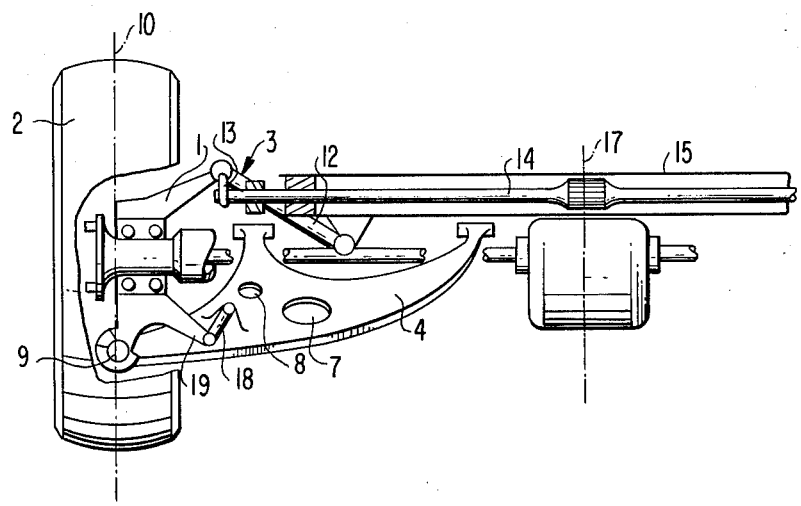

United States Patent [19]
von der Ohe

[11] 4,132,431
[45] Jan. 2, 1979

[54] WHEEL SUSPENSION

[75] Inventor: Manfred von der Ohe, Stuttgart, Germany

[73] Assignee: Daimler-Benz Aktiengesellschaft, Germany

[21] Appl. No.: 747,931

[22] Filed: Dec. 6, 1976.

[30] Foreign Application Priority Data
Dec. 5, 1975 [DE] Fed. Rep. of Germany ....... 2554715

[51] Int. Cl.² ............................................. B62D 7/10
[52] U.S. Cl. .................................. 280/691; 267/20 A
[58] Field of Search ............... 280/697, 726, 688, 690, 280/696, 715, 717, 723, 725, 721; 267/20 A, 20 R, 15

[56] References Cited
U.S. PATENT DOCUMENTS

| 3,603,422 | 9/1971 | Cordiano | 267/20 |
| 3,620,548 | 11/1971 | Winsen | 267/20 A |
| 3,771,813 | 11/1973 | Stotz | 267/20 |

Primary Examiner—Philip Goodman
Attorney, Agent, or Firm—Craig & Antonelli

[57] ABSTRACT

A wheel suspension with different swinging lengths in case of unidirectional and alternate spring movements and with a wheel spring system including for each wheel a spring and/or shock absorber as well as a wheel guide member which is pivotally connected on the body side thereof and which is loaded by the spring and/or shock absorber; the pivotal connection of the wheel guide member on the wheel side is thereby provided in the wheel center longitudinal plane and within a vertical plane extending transversely thereto and containing the point of contact of the wheel with the road.

15 Claims, 2 Drawing Figures

WHEEL SUSPENSION

The present invention relates to a wheel suspension with differing swinging lengths (camber change) in case of unidirectional and alternate spring movements and with a wheel spring system including a spring and/or shock absorber as well as with a wheel guide member which is pivotally connected on the body side and loaded by way of the spring and/or the shock absorber.

With known wheel suspensions of this type, the translation of shock absorber and spring are poorer in case of alternate spring movements than in case of unidirectional spring movements. The poorer spring translation during the alternate spring movements can thereby be compensated by an additional stabilizer. In view of the poorer shock absorber translation, a comparable possibility does not exist therefor and a compromise has to be aimed at therefore between unidirectional and alternate spring movements, i.e., between spring movements directed in the same direction on the part of the mutually opposite wheels and the spring movements directed in opposite directions by the two mutually opposite wheels of a wheel axle.

A wheel suspension of the aforementioned type is to be provided by the present invention with a view toward an improvement of the aforementioned disadvantages and an at least approximately identical translation or transmission ratio for the spring and shock absorber is to be achieved in case of unidirectional and alternate spring movements.

This is achieved according to the present invention in a wheel suspension of the aforementioned type in that the wheel guide member is located on the side of the wheel at least approximately within the wheel center longitudinal plane and within a vertical cross plane transversely thereto and containing the point of contact of the wheel with the road. This type of pivotal connection at the wheel side has as a consequence that the wheel guide member carrying the spring and/or the shock absorber carries out the same angular deflection in case of unidirectional and alternate spring movements and therewith the spring translation and the shock absorber translation are therefore identical in case of unidirectional and alternate spring movements.

Accordingly, it is an object of the present invention to provide a wheel suspension which avoids by simple means the aforementioned shortcomings and drawbacks encountered in the prior art.

Another object of the present invention resides in a wheel suspension in which the translation ratio of shock absorber and spring are at least approximately the same with unidirectional and alternate spring movements.

A further object of the present invention resides in a wheel suspension of the type described above which is simple in construction, yet improves the performance of the wheel suspension under different operating conditions.

Still another object of the present invention resides in a wheel suspension in which the swinging lengths remain substantially the same in case of unidirectional and alternate spring movements.

Figure 2:
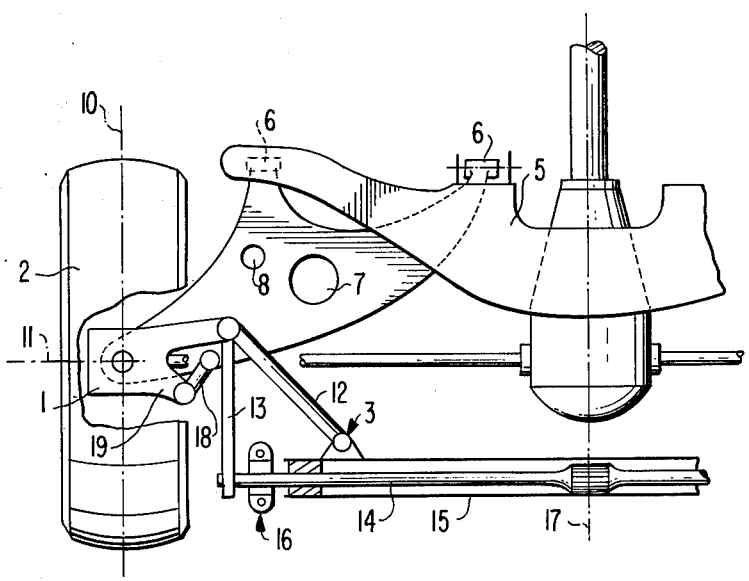

These and other objects, features and advantages of the present invention will become more apparent from the following description when taken in connection with the accompanying drawing which shows, for purposes of illustration only, one embodiment in accordance with the present invention, and wherein:

FIG. 1 is a schematic partial rear elevational view, partly in cross section, of an independent wheel suspension of a passenger motor vehicle, which wheel suspension is symmetrical to the vehicle longitudinal center plane; and FIG. 2 is a schematic plan view on the wheel suspension of FIG. 1, again partly in cross section.

Referring now to the drawing wherein like reference numerals are used throughout the two views to designate like parts, in the wheel suspension illustrated in the two figures, the wheel carrier 1, on which is supported or journalled the wheel 2, is guided by way of an upper guide member 3 and by way of a lower guide member 4 as wheel guide members, whereby the lower guide member 4 is pivotally connected at the vehicle body (not shown) by way of a drive stool 5, on which are provided the bearing places 6 of the lower guide member 4 which determine the pivot axis thereof that extends essentially in the vehicle transverse direction. As schematically indicated, a fastening means 7 for the spring and a fastening means 8 for the shock absorber are provided on the lower guide member 4 so that the spring and the shock absorber are carried by this lower guide member 4.

The pivotal connection of the lower guide member 4 at the wheel carrier 1 takes place, as can be seen from the two figures, at a point of pivotal connection 9 which is located essentially in the wheel center longitudinal plane 10 and in a vertical cross plane 11, both planes containing the point of contact of the wheel with the road.

The upper guide member 3 is subdivided and consists of two guide arms 12 and 13, whose pivotal connection on the body side takes place respectively at a tubular casing 15 rotatable in unison with the torsion rod 14 during unidirectional spring movements and directly at the torsion rod 14 which itself is rotatably connected with the vehicle super-structure by way of bearings 16. A non-rotational connection is provided between the torsion rod 14 and the tubular casing 15 within the area of the vehicle longitudinal center plane 17, which in case of alternate spring movements brings about a rotation of the two torsion rod halves with respect to one another while the tubular casing 15 remains stationary in the respective given position, and which in case of unidirectional spring movements brings about an entrainment in the rotational direction of the tubular casing 15 together with the torsion rod 14.

The points of pivotal connection of the upper guide member 3 and of the lower guide member 4 at the wheel carrier 1 determine the axis of rotation of the latter, while the track control of the wheel 2, i.e., the respective pivotal position of the wheel with respect to this axis of rotation is determined by the track-rod or tie-rod 18, which is provided between an extension 19 of the wheel carrier 1 and the lower guide member 4.

In such a wheel suspension, the torsion rod 14 which is located within the tubular casing 15 and forms a stabilizer, controls the unidirectional and alternate camber behavior of the axle. It is thereby appropriate if the torsion rod 14 is kept as free as possible of starting, braking and forces due to the contact of the wheel with road in order to avoid undesired camber changes. This requirement is also fulfilled by the construction of the wheel suspension in accordance with the present invention if, as illustrated in the embodiment, the outer guide arm 13 of the upper guide member 3 extends in the vehicle driving direction and the tie-rod or track-rod 18 is pivotally connected at the lower guide member 4. With such a construction, more particularly, the forces due to the wheel contact with the road surface remain without influence on the upper guide member 3 and the forces which occur during starting and braking, become effective in the upper guide member 3 only as tension or compression forces, especially since any possible moment about the axis of rotation of the wheel is transmitted directly onto the lower guide member 4 by way of the track-rod or tie-rod 18. The stabilizing torsion rod 14 is therefore now stressed only when driving through curves and only slight camber changes conditioned by the elasticity of the torsion rod will now result which, however, do not exceed the customary values of rigid axles and De-Dion axles.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A wheel suspension having mutually opposite wheels on a common wheel axle, with differing swinging lengths in case of unidirectional spring movements by said mutually opposite wheels as compared to alternate spring movements by said mutually opposite wheels, which wheel suspension comprises a wheel spring means as well as a wheel guide means pivotally connected on a body side and loaded by the wheel spring means, characterized in that the wheel guide means is pivotally connected on a wheel side at a point at least approximately within the wheel center longitudinal plane and at least approximately within a vertical cross plane extending substantially transversely thereto, both of said planes substantially containing a point of contact of the wheel with a road.

2. A wheel suspension according to claim 1, characterized in that the wheel spring means include at least one of spring and shock absorber means.

3. A wheel suspension according to claim 2, characterized in that the wheel spring means includes both spring and shock absorber means.

4. A wheel suspension according to claim 1, characterized in that the wheel guide means carrying the wheel spring means is formed by a guide member extending generally in the vehicle longitudinal direction.

5. A wheel suspension having mutually opposite wheels on a wheel axle, with differing swinging lengths in case of unidirectional spring movements by said mutually opposite wheels as compared to alternate spring movements by said mutually opposite wheels, which comprises a wheel spring means as well as wheel guide means pivotally connected on the body side and loaded by the wheel spring means, characterized in that the wheel guide means is pivotally connected on the wheel side at least approximately within the center longitudinal plane of the wheel and at least approximately within a vertical plane extending substantially transversely thereto and substantially containing the point of contact of the wheel with the road, in that the wheel guide means carrying the wheel spring means is formed by a guide member extending generally in the vehicle longitudinal direction, and in that the wheel suspension is an independent wheel suspension including a lower guide means, an upper guide means and a wheel carrier means connecting said lower and upper guide means.

6. A wheel suspension according to claim 5, characterized in that the lower guide means is pivotally connected with an extension of the wheel carrier means by way of a track-rod means.

7. A wheel suspension with differing swinging lengths in case of unidirectional and alternate spring movements, which comprises a wheel spring means as well as wheel guide means pivotally connected on the body side and loaded by the wheel spring means, characterized in that the wheel guide means is pivotally connected on the wheel side at least approximately within a vertical plane extending substantially transversely thereto and substantially containing the point of contact of the wheel with the road, characterized in that the wheel guide means carrying the wheel spring means is formed by a guide member extending generally in the vehicle longitudinal direction, characterized in that the wheel suspension is an independent wheel suspension including a lower guide means, an upper guide means and a wheel carrier means connecting said lower and upper guide means, characterized in that the lower guide means is pivotally connected with an extension of the wheel carrier means by way of a track-rod means, and characterized in that the upper guide means includes a first guide arm extending substantially in the vehicle longitudinal direction and connected with a torsion rod and a second guide arm pivotally connected with an outer end of a tubular casing which surrounds said torsion rod at least partly and is non-rotatably connected with the torsion rod substantially in the center thereof.

8. A wheel suspension according to claim 7, characterized in that the lower guide means is pivotally connected on the body side with the pivot axis thereof extending generally transversely to the longitudinal direction of the vehicle.

9. A wheel suspension according to claim 8, characterized in that the lower guide means is indirectly connected with the body of the vehicle by way of a driving stool.

10. A wheel suspension according to claim 9, characterized in that the wheel spring means includes both spring and shock absorber means.

11. A wheel suspension according to claim 1, characterized in that the wheel guide means is a lower guide means and further characterized in that the wheel suspension includes an upper guide means and a wheel carrier means connecting said lower and upper guide means.

12. A wheel suspension according to claim 11, characterized in that the lower guide means is pivotally connected with an extension of the wheel carrier means by way of a track-rod means.

13. A wheel suspension having mutually opposite wheels on a wheel axle, with differing swinging lengths in case of unidirectional spring movements by said mutually opposite wheels as compared to alternate spring movements by said mutually opposite wheels, which comprises a wheel spring means as well as wheel guide means pivotally connected on the body side and loaded by the wheel spring means, characterized in that the wheel guide means is pivotally connected on the wheel side at least approximately within the center longitudinal plane of the wheel and at least approximately within a vertical plane extending substantially transversely thereto and substantially containing the point of contact of the wheel with the road, in that the wheel suspension is an independent wheel suspension including a lower guide means, an upper guide means and a wheel carrier means connecting said lower and upper guide means, and in that the upper guide means includes a first guide arm extending substantially in the vehicle longitudinal direction and connected with a torsion rod and a second guide arm pivotally connected with an outer end of a tubular casing which surrounds said torsion rod at least partly and in non-rotatably connected with the torsion rod substantially in the center thereof.

14. A wheel suspension according to claim 11, characterized in that the lower guide means is pivotally connected on the body side with the pivot axis thereof extending generally transversely to the longitudinal direction of the vehicle.

15. A wheel suspension according to claim 11, characterized in that the lower guide means is indirectly connected with the body of the vehicle by way of a driving stool.

* * * * *